(12) United States Patent
Landresse

(10) Patent No.: US 6,370,528 B1
(45) Date of Patent: Apr. 9, 2002

(54) HIGH SPEED METHOD FOR FLUSHING DATA BUFFERS AND UPDATING DATABASE STRUCTURE CONTROL INFORMATION

(75) Inventor: P. J. Landresse, Capistrano Beach, CA (US)

(73) Assignee: Unisys Corporation, Blue Bell, PA (US)

( * ) Notice: Subject to any disclaimer, the term of this patent is extended or adjusted under 35 U.S.C. 154(b) by 0 days.

(21) Appl. No.: 09/322,534

(22) Filed: May 28, 1999

(51) Int. Cl.[7] .............................................. G06F 17/30
(52) U.S. Cl. ................................ 707/8; 707/1; 707/10; 707/200
(58) Field of Search .......................... 707/8, 200, 10, 707/1; 709/103, 107; 714/11–12; 710/20, 33, 52

(56) References Cited

U.S. PATENT DOCUMENTS

| | | | |
|---|---|---|---|
| 5,369,757 A | * 11/1994 | Spiro et al. | 714/19 |
| 5,408,653 A | * 4/1995 | Josten et al. | 707/8 |
| 5,455,944 A | * 10/1995 | Haderle et al. | 707/202 |
| 5,455,946 A | * 10/1995 | Mohan et al. | 707/202 |
| 5,806,059 A | * 9/1998 | Tsuchida et al. | 707/2 |
| 5,864,657 A | * 1/1999 | Stiffler | 714/15 |
| 6,088,705 A | * 7/2000 | Lightstone et al. | 707/200 |
| 6,101,504 A | * 8/2000 | Gord | 707/201 |

OTHER PUBLICATIONS

Lu et al, Dynamic and load–balanced Task–Oriented Database Query Processing in Parallel Systems, 1992, pp. 357–372.*

Lu et al, Dynamic and Load–Balanced Task–Oriented Database Query Processing in Parallel Systems, Department of Information Systems and Computer Science National University of Singapore. 1992, pp. 357–372.*

* cited by examiner

Primary Examiner—John Breene
Assistant Examiner—Debbie M Le
(74) Attorney, Agent, or Firm—Alfred W. Kozak; Mark T. Starr; Lise A. Rode

(57) ABSTRACT

A method is provided in a multi-processing system where multiple user programs can operate concurrently and simultaneously to access a series of database access methods which hold multiple buffer units. Thus, there can operate simultaneously a series of Write operations to the buffer units which copy the buffer information into specialized file structures followed by a parallel series of Input/Output completion operations which test the results of the copy operations followed by parallel and simultaneous writing to the file structures of the storage control information necessary to maintain their physical integrity.

6 Claims, 14 Drawing Sheets

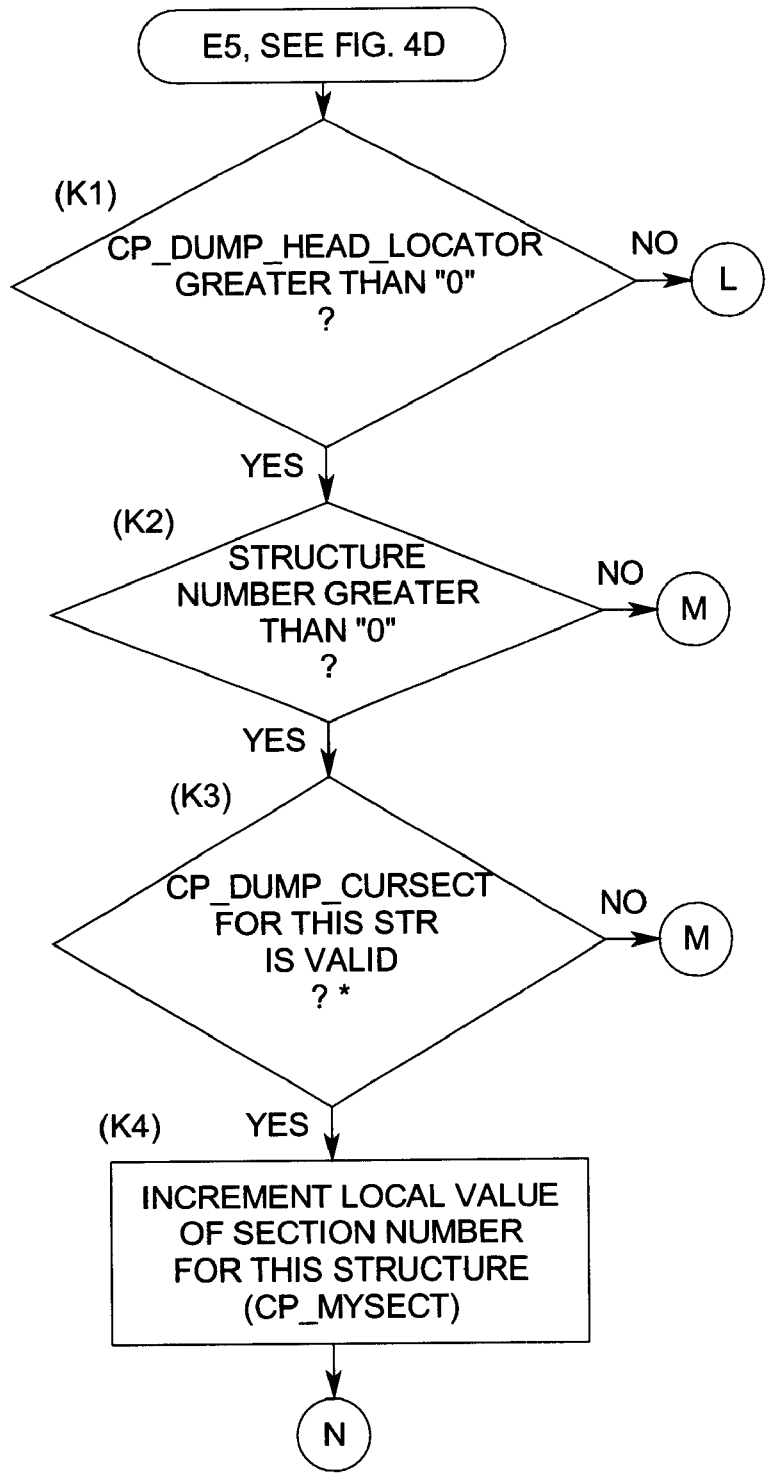
FIG. 4I1

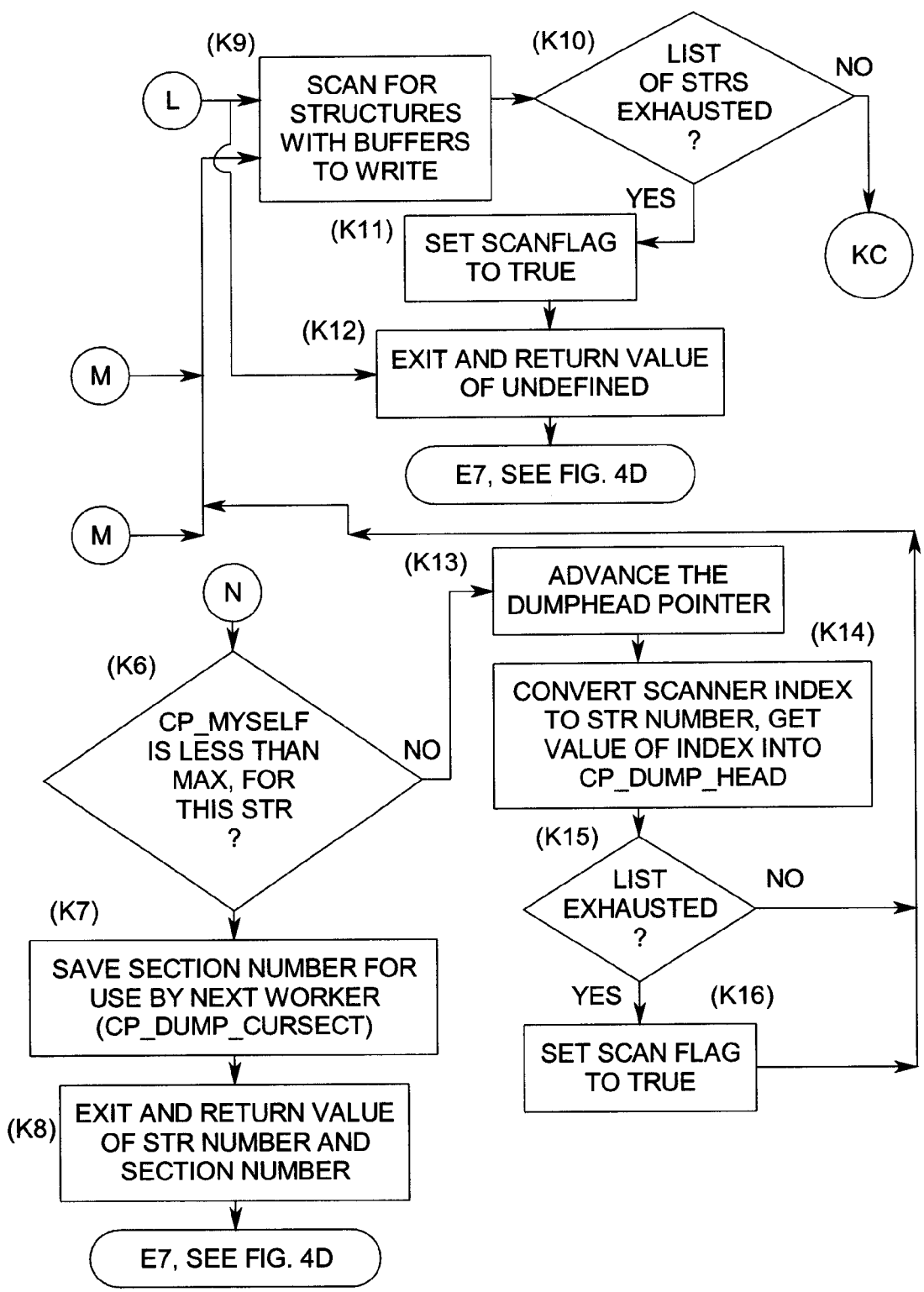
FIG. 4I2

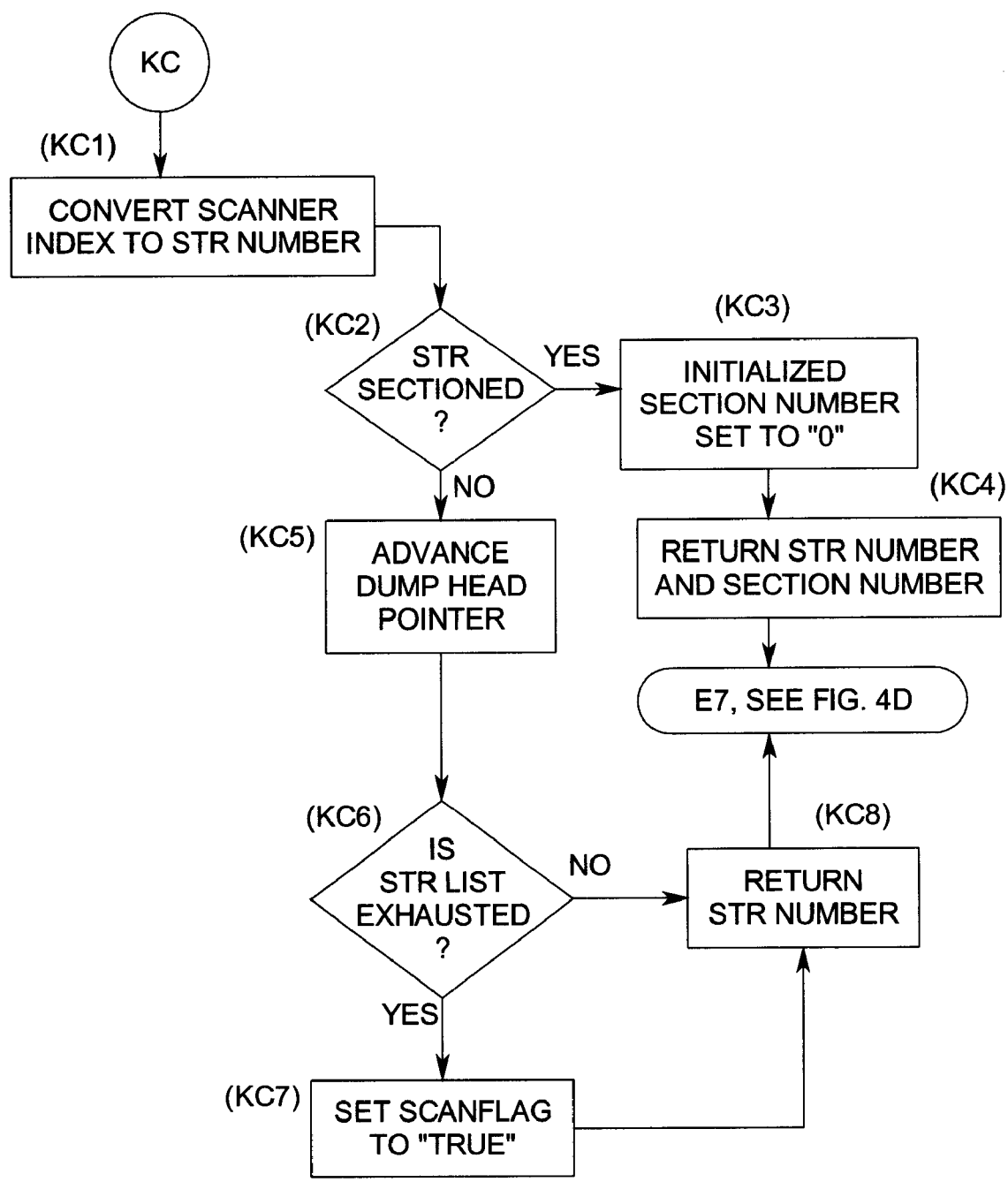
FIG. 4I3

HIGH SPEED METHOD FOR FLUSHING DATA BUFFERS AND UPDATING DATABASE STRUCTURE CONTROL INFORMATION

CROSS-REFERENCES TO RELATED APPLICATIONS

This application is related to a co-pending application, U.S. Ser. No. 09/322,534 and is entitled "Multi-Processor System for Database Management" which is incorporated herein by reference.

FIELD OF THE INVENTION

This disclosure relates to multi-processing and multi-programming environments which require the flushing of data buffers and updating of the database structure control information.

BACKGROUND OF THE INVENTION

It is recognized that modern computer and communication systems continuously utilize huge mounts of data. Often as a result of this, the data management and data storage operations have been seen to become significant technical issues. Multi-programing and multi-processing operations which are typical of complex systems have large data requirements which require the use of massive amounts of storage.

In such multi-processing and multi-programing type systems, the data is generally stored on a storage media, such as magnetic disk, as blocks of data. Subsequently, the data is often read from the storage media into a temporary memory such as a cache or buffer which might consist of Random Access Memory. After this, it can be accessed by user application programs. One of the chief problems involved has to do with the updating of the database structure control information and flushing the data buffers of stale information. It is desirable that each of these updates will occur utilizing the minimal or least amount of time by taking advantage of the computer systems ability to run asynchronous processes and to overlap the Input/Output operations.

The optimum situation for the taking place of Input/Output operations is that they take place while no user applications are actively accessing that particular data within the database. Copies of the data will exist both within the applications and within the database. This is done to maintain both physical and referential data integrity. It is quite consistently necessary to provide updates to the database's buffers, and rather than maintaining control as a single process, or initiating multiple new independent processes to perform the updates, it is possible to use local environments that can access shared data and be so used to take advantage of the user application infrastructures that are already present. These types of procedures can, in effect, run "on top" of the user programs.

Prior systems which flushed data buffers and updated the database structures operated on a relatively slow serial basis. This type of mechanism was responsible for determining which of the structures had data buffers to be flushed, then writing to the disk, then testing for Input/Output completion, then writing the control information, then restarting the other applications. Due to the fact that this was a serialized process, it was not only inefficient, but did not take advantage of the performance that is inherently possible in multi-processor technology.

The presently described method operates to eliminate the relatively slow serial process and provide a fast high-speed flushing of data buffers and operations for updating the database structure control information. The described method and system is completely asynchronous. Rather than simply waiting, the user tasks are utilized concurrently in time as workers and as such, user tasks participate in the process of independently writing the data buffers, then testing for I/O completions, and finally updating the structure control information.

In the presently-described method, various tasks may enter the process and engage at any particular phase or change roles at any time. These processes are "First-In, First-Out" (FIFO) in nature. As an example, the task initiating the WRITES for a given set of data buffers is not necessarily the task that assures their completion.

Further, coordination is achieved by selecting a single process to perform only those housekeeping functions that absolutely require serialization. The use of shared data is limited only to those instances where it is required to drive the process forward. Asynchrony is further assured by only restricting access, via a software data lock, to those instances where the shared variables require alteration. This mechanism limits serialization to the absolute minimum necessary to ensure integrity. The previously used systems and methods for a given database configuration, did not significantly benefit from an increase in performance beyond that which could be afforded only by the addition of a second processor. Thus, the operations did not appropriately scale in proportion to the number of processors added. However, the presently described system and method has the advantage of being about 30% faster for two and three processor configurations, and of continuing to provide increased throughput even as the workload increases and additional processors are added.

SUMMARY OF THE INVENTION

The present method describes an asynchronous mechanism for distributing the operating workload of flushing data buffers over "N" number of processes. One distinct advantage involved is that of making use of the user tasks already running on the computer system, so that the time required to accomplish a given task is minimized in two specialized ways.

Firstly, all of the write operations are initiated: this indicates that there is a high probability that the first set of Write operations will have finished even before the last set of Write operations have been initiated. Then, in a similar fashion, the requisite testing for the correct completion of each of these operations is handled. That is to say, by using the same orderly sequence as in the initiation sequence then, the majority, if not all, of the Writes will have completed by the time the completion information has been examined. As a result the probability of having to wait for some operation to complete, is extremely low.

Secondly, the workload is spread across the active update users of the database. This allows the multi-processor system to also take advantage of its ability to perform multiple tasks simultaneously. A concomitant advantage is that the use of the existing application tasks does not burden the system with the overhead of initiation, and the management thereof with specialized tasks to perform these functions. Thus, the method takes full advantage of the parallelism inherent in multi-processor systems.

BRIEF DESCRIPTION OF THE DRAWINGS

FIGS. 4I1, 4I2 and 4I3 show the flow chart sequence of CONTROLPOINTDUMPSKAN.

GLOSSARY OF TERMS

Figure 1:
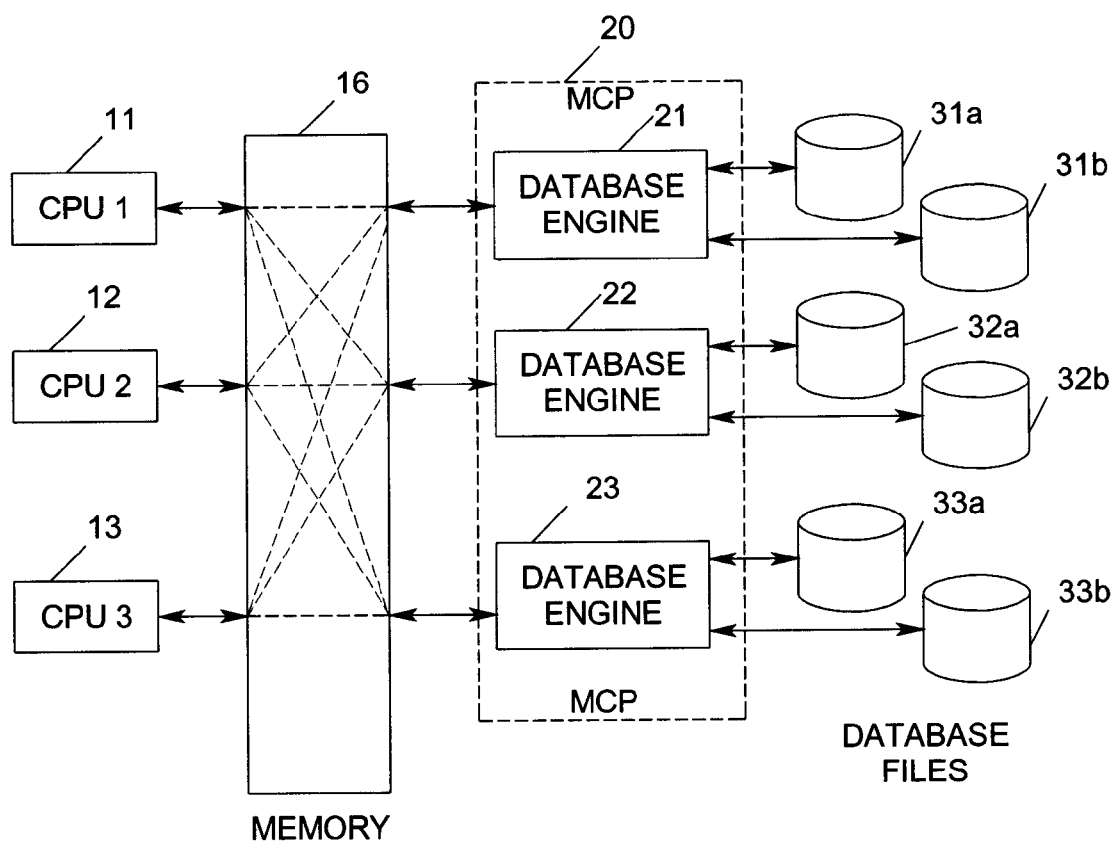
FIG. 1 is a drawing of a multi-processor/multi-program operating system which provides management services such as access coordination and I/O handling between data structures in memory and file data located on a series of storage media.

ALL DUMPBUFFERS: An array used to hold descriptors to the DUMPBUFFERS procedures for the various data structures. It is filled in each time the database runs. This technique is used to permit the calling of certain data structure functions from areas that would not normally have visibility to them due to the rules of scope as defined for lex Levels. This feature in not accessible by user application programs and does not compromise security in any way. See also DUMPBUFFERS ASYNCHRONOUS PROCESS: A process or procedure that can execute independently of its parent or siblings.

AUDITCONTROLPOINT: This procedure is the router for the work that must be accomplished to successfully complete a Control Point. Many of its functions are of a housekeeping nature.

BLOCK:
(1) A group of physically adjacent records that can be transferred to or from a physical device as a group.
(2) A program, or a part of a program, that is treated by compilers as a discrete unit. Examples are a procedure in ALGOL, a procedure or function in Pascal, a subroutine or function in FORTRAN, or a complete COBOL program.

BUILDCONTROLPOINTDUMPLIST: This procedure scans one of the parallel arrays in the DCB (DCBCONTROLWORDS) looking for a particular bit that indicates whether the buffer has been modified and must be flushed during the Control Point. When a buffer index is found, it is placed into the CP_DUMP_HEAD location that corresponds to its structure number and the previous entry is moved into CP_DUMP_LIST.

COMMONDBS: A set of procedures and defines that are included into all structure types that can be declared for a database. By utilizing certain capabilities of the compiler they become tailored (for the particular structure type) by the compiler during the compilation process. This technique results in very efficient run-time execution as many of the decisions and steps that would normally be required during execution have been eliminated.

CONTROL(ING) STACK: A term used to identify the stack that actually initiates and finishes the work necessary to perform a Control Point.

CONTROLPOINT: In Data Management System II (DMSII), a feature that limits the amount of audit information scanned by halt/load and Abort recovery. The CONTROLPOINT is performed when the last process leaves the transaction state.

CONTROLPOINTDUMP: Prior to implementation of this invention, this procedure centralized control (non-distributive) of the process for data and storage control buffers during a Control Point.

CONTROLDUMPSKAN: Scans CP_DUMP_HEAD and returns the structure and section numbers for structures having buffers that must be flushed during the Control Point.

CP DUMP CURSECT: Used in CP_DUMPBUFFS and CPGETALLSTRNUMS to supply the current section number to the next worker task that wants to perform buffer work during a control point. It is indexed by structure number.

CP DUMP HEAD: Head of the list (by structure) of DCBs (Data Control Blocks) to be written during the control point. It is indexed by structure number.

CP DUMP HEAD LOCATOR: An index into CP_DUMP_HEAD that is used to indicate when the list represented by CP_DUMP_HEAD has been exhausted.

CP DUMP LIST: The list of DCBs to be written during the control point. Indexed by DCB. CP_DUMP_HEAD is the beginning of this list.

CP DUMP SECTINFO: The maximum number of sections that have been declared for a structure. Used in conjunction with CP_DUMP_CURSECT. Indexed by structure number.

CP DUMPBUFFS: Coordinates the retrieval of structure and section numbers from CP_DUMP_LIST and calls the DUMPBUFFERS procedure for the associated structure. This is the key procedure for assuring that all of the Control Point buffer write activity occurs in parallel.

CP MYSTR: The value of a structure number extracted from a DCB (Data Control Block). It is used by the process described by this document to call ALL_DUMPBUFFERS for a particular data structure during control point activity.

CP SOC BUF: The name given to a set of buffers used for reading and writing a data structure's storage control information. Prior to this invention a single buffer was used for any given database. Now, there is a buffer for each data structure. This permits storage control I/O operations to occur in parallel for multiple data structures.

CP STEP: Used to synchronize the control point process. It prevents the asynchronous process from performing the same housekeeping tasks more than once. One of its values also signifies that the buffer activities associated with control points have been completed.

CP STRSTOPROCESS: The sum of the number structures and sections to be processed at control point time.

CP TOTAL SECTS: The total number of sections for all data structures.

CP WORKERCOUNT: The count of the number of control point workers.

CPGETALLSTRNUMS: Returns values of all possible structure and section numbers for the database. These are used for updating storage control information.

CPINPROGRESS: A Boolean that indicates that the buffer writing phase of Control Point activity is in progress. One of its uses is to prevent applications just entering database code from attempting to perform updates.

CPT LOCK (Control Point Lock): A software lock used to synchronize changes to variables that can be seen by all of the stacks participating in the Control Point process. It prevents such things as double counting and having multiple stacks attempting to write buffers that belong to the same structure and, or, skipping a structure.

CTLSTACK: All stacks calling CP_DUMPBUFF include a single Boolean parameter. Within CP_DUMPBUFFS it is known as CTLSTACK and indicates whether the caller is a "worker" or the stack that has overall responsibility for the Control Point process. Only one task is allowed to control the process; this is the stack that triggered the control point (i.e. the last one out of transaction state when the count of transactions had reached a user specified value).

D2. D3 . . . DM: See lexical level.

DATABASE ENGINE: A general term for the software that manages the access to and activity within database files.

DATABASE PROGRAM: A software application that allows for the storage and retrieval of information which is structured as fields, records and files. Often called DBMS, Database Management System.

DATABASE STRUCTURES: DMSII structures are the building blocks of every DMSII database. All structures are files of type DBDATA. The structures are made up of common file components: records and fields. Each structure can be standard or it can have one or more special characteristics that governs either the type of data the database stores or the way applications can access the data.

DMSII: A data management system provided for Unisys Corporation computer systems. This is software that allows a User to manage multiple data files. An overview of this system is detailed in *Unisys Publication Part* 8807 6625-000, dated September 1997 and is entitled "Getting Started with DMSII".

DCB (DATA CONTROL BLOCK): A Data Control Block represents control information that pertains to a particular buffer. In order to utilize system memory efficiently, Data Control Blocks are implemented as a series of parallel arrays. Each of these arrays is unique in that it contains information of a particular type (e.g. the I/O results for all buffers are contained in an array called IORESULTS). A DCB is a variable that represents one word out of each of these arrays: DCB "n" thus consists of USERCOUNTS [n], BUFFDESCS [n], IORESULTS [n], etc. Active DBC's are organized in 1 to 1 correspondence with active buffers.

DCB NUMBER: The index value of a particular DCB.

DCBCONTROLWORD: A define that indexes into DCB-CONTROLWORDS for a particular DCB number: DCB-CONTROLWORDS [DCB].

DCBCONTROLWORDS: One of the parallel arrays that make up the DCB. It contains some of the physical information related to the buffers.

DMSCAUSE: The DMSCAUSE statement is used for deadlock detection within DMSII functions. This statement calls the operating system procedure DMSCAUSE and passes a single parameter. The effect of the statement is dependent on the value of the parameter.

Value<0: Indicates that the calling stack has left transaction state. The program is delinked from the transaction state linkage chain.

Value=0: Indicates that a syncpoint or controlpoint has been completed. All programs (stacks) waiting for this action are resumed.

Value>0: Indicates that a record for which other users are waiting has been freed. The value of the parameter in the stack number of the previous owner of the record. All programs waiting on that stack number are resumed.

This DMSCAUSE restricted to use only by the Access-routines (database engine).

DMSII: Data Management System II. The trademarked name of the database management system used with certain models of Unisys mainframe computers.

DUMPBUFFERS: This procedure is used to control the actual writing and I/O completion testing for data and storage control buffers. A parameter determines which action(s) to perform.

EXTENDED EDITION (XE): An enhanced version of DMSII that introduced the concept of Sectioned data structures.

FIELDS: A field is a consecutive group of bits or bytes within a component of a record that represents a logical piece of data. A field (or column) is defined by the description of the data item it is to hold. As a point of information, sometimes in ordinary conversation, the name of the field is identified by the name of the data item. For example, for a data item named NAME, the field in the record can also be called NAME.

FLUSH(ING): This term is typically used in conjunction with buffers and indicates that they have been written to disk. The space occupied by whatever has been "flushed" may or may not become available for other uses.

HELPER STACK: A stack that assists with rapid completion of a control point by performing data and storage control writes operations.

I/O Input/Output. An operation in which the system reads data from or writes data to a file on a peripheral device such as a disk drive.

I/O COMPLETION: An Input or Output (read or write) operation has completed. This is not an indication of success or failure; but simply that the action is no longer "in progress".

LEX LEVEL: See lexical level.

LEXICAL LEVEL (LEX LEVEL):

(1) A number that indicates the relative level of an addressing space within the stack of an executing program. Lexical levels range from 0 through either 15 or 31, depending on the computer family. A lower lexical level indicates a more global addressing space.

(2) A measure of the number of other blocks a block is nested within. The outer block of a program has a lex level of 2 or 3, depending on whether the program has a procedure heading. Each block has a lex level one higher than the block it is nested within.

LEXICOGRAPHICAL: Pertaining to a collation scheme used to order the true objects.

MCP: Master Control Program. The trademarked name of the proprietary operating system used with certain models of Unisys mainframe computers.

MODIFIED: Whenever a data record is changed, the data block in which it resides is considered to be "modified".

OP WORD: A general term for a parameter that signals which Operations will be performed by a task or procedure.

PARAlLEL ARRAY: A series of arrays that share a common indexing scheme. A column, indexed by "n", represents an aggregate of information about some object. A Data Control Block is an example of this.

PROCESS STACK: A memory structure that stores information about the current state of the execution of a procedure. The process stack includes activation records for all blocks that the process has entered and not yet exited. Synonym for stack.

PROCESS STATE: The current status of a process. The three process states are scheduled, active, or suspended.

PROCESS SWITCHING: An event that occurs when the operating system tells the central processing unit (CPU) to execute a different program. Also called Task Switching.

PROCESS:
(1) The execution of a program or of a procedure that was initiated. The process has its own process stack and process information block (PIB). It also has a code segment dictionary, which can be shared with other processes that are executions of the same program or procedure.
(2) A software application; that is, any activity or systematic sequence of operations that produces a specified result.

RECORDS: A record is a group of logically related data items in a file. Sometimes a record is called a row. The data items reside in fields in the records. Sometimes a field is called a column.

REFERENTIAL INTEGRITY: A method by which data consistency is maintained in a database.

SCREEN DESIGN FACILITY (SDF): A Unisys application software product used for designing and managing forms that are displayed on a terminal (computer screen).

SCREEN DESIGN FACILITY PLUS (SDF PLUS): An enhanced version of (SDF).

SECTION NUMBER: The internal number assigned to each member (section) of a sectioned data structure. Section numbers are unique only within the scope of their logical data structure. For example, within a given database a structure named EMPLOYEE could have a section numbered as 2 and another data structure named PRODUCTS could also have a section numbered as 2.

SECTION(ED, ING): Sectioning is a technique of mapping the logical concept of a data structure onto multiple physical files (sections). This technique allows a logical file to exceed size limitations that may be imposed by any single physical file. It is also useful for organizing data into groupings.

SECTION SB: This is a set of procedures used when dealing with the physical sections of a sectioned data structure* It utilizes a method of compilation that allows it to be called as though the software was indexing into an array. For example: SECTION_SB [section-number] .STROPENSTRUCTURE would call the STROPENSTRUCTURE procedure for the section denoted by section-number.

SERIALIZATION: See Single Threaded.

SINGLE THREADED: Only one action can occur at a time; e.g. "A" then "B" then "C". Each of these actions much be complete before the next can be initiated.

STACK: A set of sequential locations in memory assigned to a task for the duration of its execution. These locations serve as temporary storage for variables, descriptors, and information pertaining to task processing. Synonym for process stack.

STORAGEOPENCLOSE: This procedure is called as part of the open and close activities for any given data structure. It is used for retrieval and update of the control information associated with data structures. It is also called on to perform the same functions during control points. STORAGEOPENCLOSE is one of the components of COMMONDBS.

STROPENSTRUCTURE: Every structure in the database has an STROPENSTRUCTURE. It is tailored at compile time and handles all of the work necessary to prepare to physically open a file. An example would be setting the file name and blocking parameters. In addition, administrative details used by and for storage control are gathered.

STRUCTURE NUMBER: Structure is a term that is analogous to file. Each file that is directly managed by the DMSII database management system is assigned a number that is internal to the database management system.

TASK: (1) A dependent process. (2) Any process, whether dependent or independent. (3) A single, complete unit of work performed by the system, such as compiling or executing a program, or copying a file from one disk to another. Tasks are initiated by a job, by another task, or directly by a user. See also process.

TRANSACTION STATE: In Data Management System II (DMSII), the period in a user-language program between a begin transaction operation and an end transaction operation. For audited databases, DMSII software allows an application program to logically group update operations and to process the group as a single transaction. The start of the group transaction is signaled by a begin transaction operation. The end of the group transaction is identified by an end transaction operation. While the program is in a begin and end transaction operation, the program and the database are in transaction state.

TRANSACTION: (1) The transfer of one message from a terminal or host program to a receiving host program, the processing carried out by the receiving host program, and the return of an answer to the sender. (2) (X/Open), a complete unit of work. It can comprise many computational tasks, data retrieval, and communication. A typical transaction modifies shared resources. (3) In data management, a sequence of operations grouped by a user program because the operations constitute a single logical change to the database. (4) In the Screen Design Facility Plus (SDF Plus), the structure that performs the transfer of the message.

UNDEFINED: A term used to represent a data value of all bits on.

WORKER STACK: See also Helper Stack.

DESCRIPTION OF PREFERRED EMBODIMENT

As was previously discussed, earlier systems and methods used a serial or sequential step-by-step process for determining which structures had data buffers to flush, after which there was a writing of the buffers and then testing for Input/Output completion, then writing the control information and then re-starting other applications. This type of "serialized process" was rather inefficient and did not take advantage of the performance available inherently in multiprocessor technology.

The present method is completely asynchronous and rather than waiting for serial tasks to be concatenated in sequence, the present system allows the user tasks to be concurrently utilized as "worker" and to participate in the process of independently writing data buffers, testing for their I/O completions, and updating the structure control information in the database files.

Now referring to FIG. 1, there is seen a multi-processor system indicating, for example, three central processing units, designated 11, 12 and 13, which are all connected to a common memory system 16.

Then, working through the memory system, it is seen that the first processor 11 is connected to the database engines 21, 22, 23 which reside in the Master Control Program 20. The database engine 21 then communicates back and forth to the data file structures indicated therein as 31a and 31b.

Likewise, the processor 12 communicates through the common memory 16 to the database engines 22, 21, 23 which then intercommunicates with the data file structures 32a and 32b.

The processor 13 communicates through the common memory to the database engines 23, 21, 22 of the Master Control Program and the database engine 23 then interconnects and intercommunicates with the database files 33a and 33b.

Figure 2:
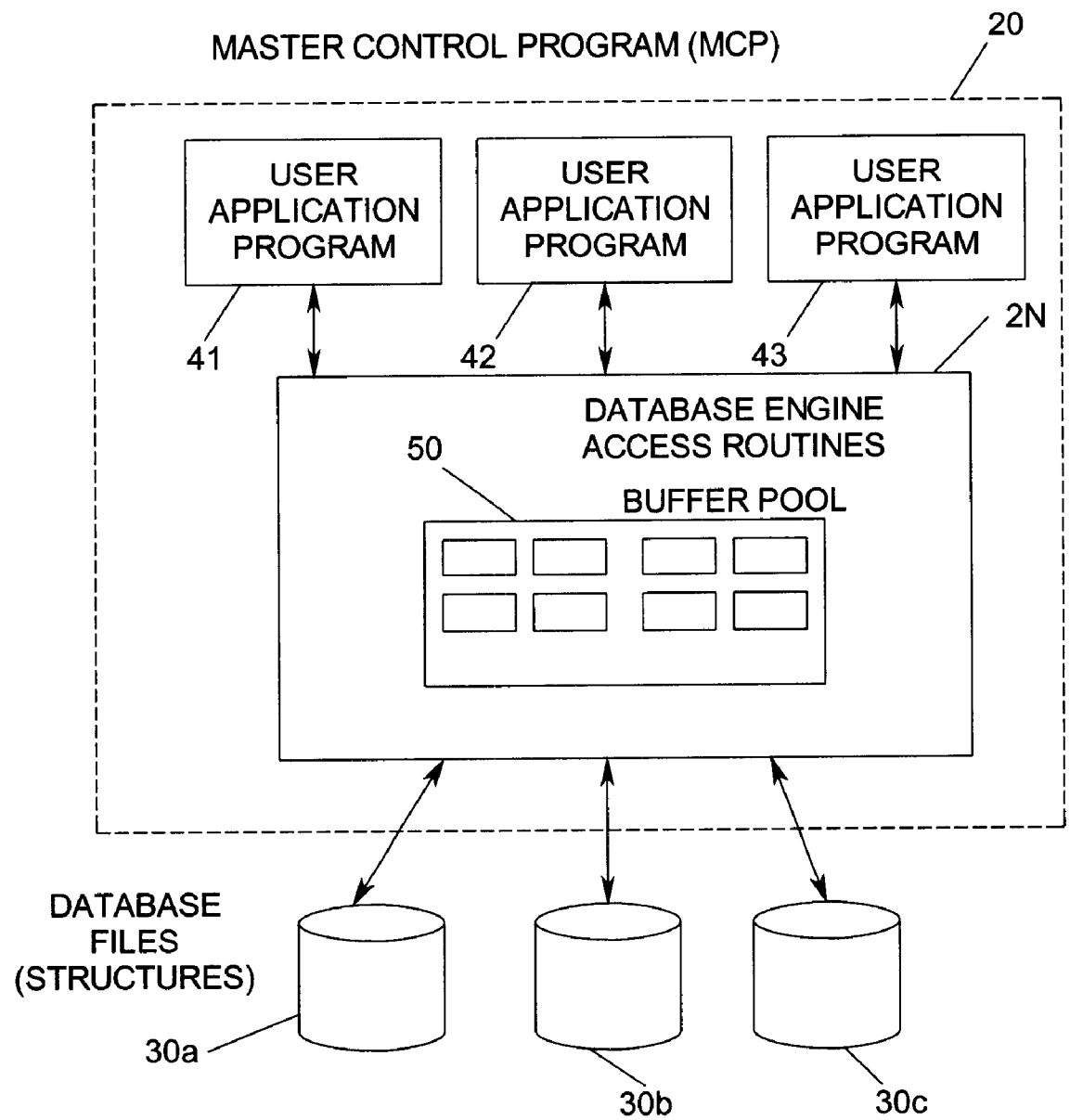
FIG. 2 is a more detailed diagram of the database engine and its operation with different user application programs.

Referring to FIG. 2, there is seen the Master Control Program 20 (MCP) which interacts with, and controls, a number of individual units some of which are shown herein as the database engine 2N which interconnects with various user-application programs shown as 41, 42, and 43.

The database engine actually includes a set of access and control routines which enable communication between the user application programs and the database engine, and also from there to a set of the database file structures indicated as 30a, 30b and 30c.

The database engine 2N is seen having a buffer pool 50 where multiple buffer units are available for the uses of the various user application programs and which can be used to copy data from specialized chosen buffers into specialized records on the database file structures.

The present system can be elucidated by the Unisys Corporation Data Management System II (DMS II), which is described in Unisys Corporation Document No. 8807 6625-000, and dated September 1997, as published by the Unisys Corporation Publications Division in Plymouth, Mich.

The following description is based on the items which have been defined in the previously-listed Glossary items which define the various concepts and software programs which are involved.

The procedure CONTROLPOINTDUMP had been used to both initiate and monitor completion of all control point Input/Output (I/O) activity. This mechanism was designed to run entirely on the stack of the last User program to leave the transaction state. As was previously indicated, the earlier control point mechanism actually created a bottleneck because it was "single-threaded", while the present system operates on a parallel operating basis which can be considered "multiple-threaded". The CONTROLPOINT, as used in the Data Management System of Unisys, is a feature that limits the amount of audit information that must be scanned by Halt/Load and the Abort/Recovery processes when recovering the database. The CONTROLPOINT is performed when the last user task leaves the transaction state, given that the requisite number of transactions have occurred or that other specialized activities are about to take place. The "transaction state" is the period in a user-language program, which occurs between a "Begin" transaction operation and an "End" transaction operation For all audited databases, the DMS II software allows an application program to logically group the update operations and to process this group as a single transaction. The start of the group transaction in signaled by a "Begin" transaction operation. The end of the group transaction is identified by a "End" transaction operation. However, while the program is between the Begin and the End transaction operation, the program and the database are considered to be in the "transaction state".

A "transaction" involves one or more of the following: (i) the transfer of one message from a terminal or a host program to a receiving host program, where the processing is carried out by the receiving host program and the return of an answer to the sender; and (ii) a complete unit of work (X/Open). This can comprise many computational tasks involving data retrieval and communication. A typical transaction modifies the shared resources (iii) In data management, a sequence of operations grouped by a user program because the operations constitute a single logical change to the database. (iv) In the Screen Design Facility Plus (SDF Plus), it is the structure that performs the transfer of the message.

The efficiency and capabilities have been greatly improved by the present system because the CONTROLPOINT mechanism has been designed to take full advantage of the inherent capabilities of both multi-programming and multi-processing environments.

Figure 3:
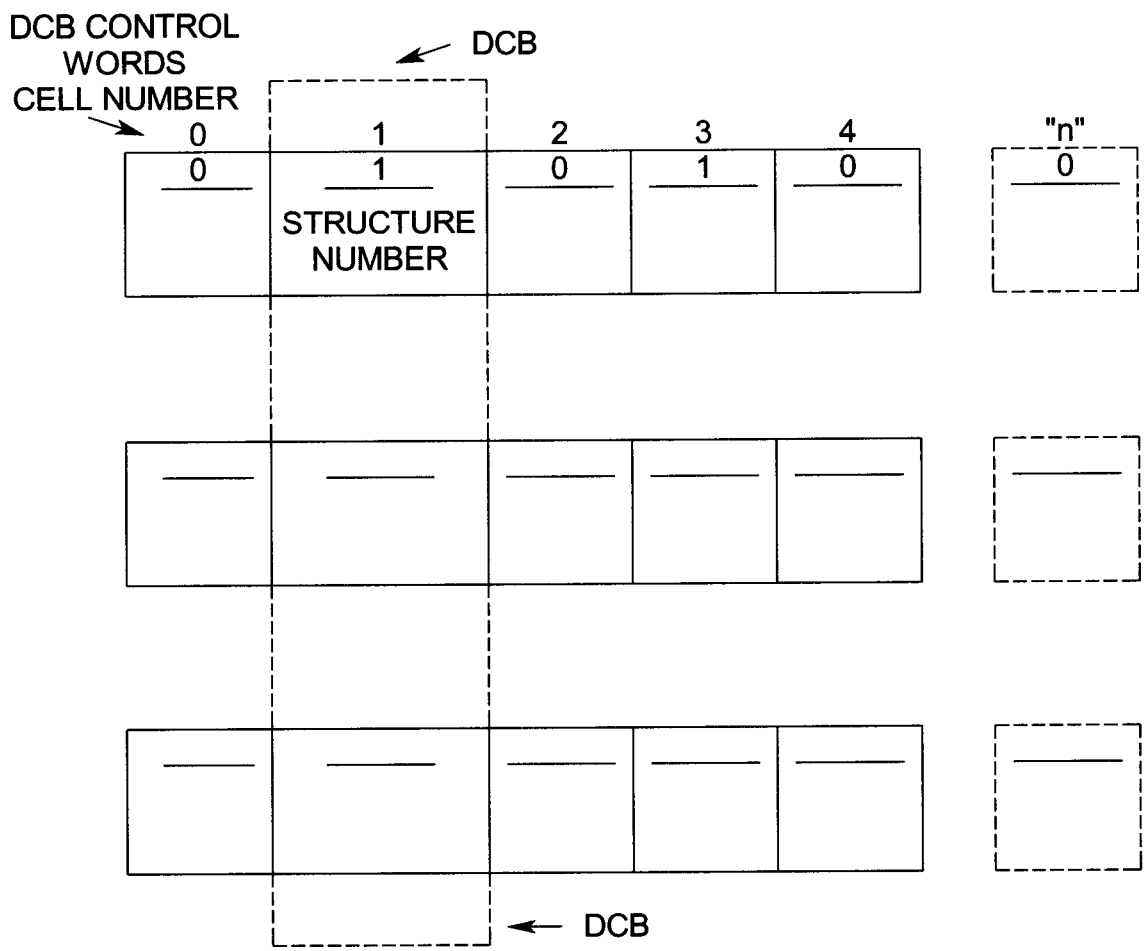
FIG. 3 is a schematic drawing illustrating the data control block control words which are shown in parallel arrays and which form cell numbers forming a set of data control block units for each cell number.

FIG. 3 is an illustration of a set of parallel arrays used for Data Control Block control words. A Data Control Block represents control information that pertains to a particular buffer. In order to utilize the system memory efficiently, Data Control Blocks are implemented as a series of parallel arrays, an seen in FIG. 3. Each of these arrays is unique, in that it contains information of a particular type, for example, the Input/Output (I/O) results for all buffers are contained in an array called IORESULTS. A Data Control Block (DCB) is a variable (data item) that represents one word out of each of these parallel arrays: DCB "N" thus consists of USER-COUNTS (N), plus BUFFDESCS (N), IORESULTS (N), and so on. Active Data Control Blocks are organized in one-to-one correspondence with active buffers.

An seen in FIG. 3, a particular DCB has a DCB number or "cell number" which is the index value of that particular DCB. Thus, the DCB at cell number 1 is seen to encompass three areas of the parallel arrays, and it is seen that the number "1" inside the upper half of the upper array indicates that a modification has taken place, while the lower part of the upper half gives the structure number. Here, the structure is a term that is analogous to a file. Each file that is directly managed by the DMS II Database Management System is assigned a number that is internal to the Database Management System. Note that the number "three" used above is for illustrative purposes and that a DCB is comprised of a larger number of parallel arrays and, further, that number does increase from time to time.

Figure 4A:
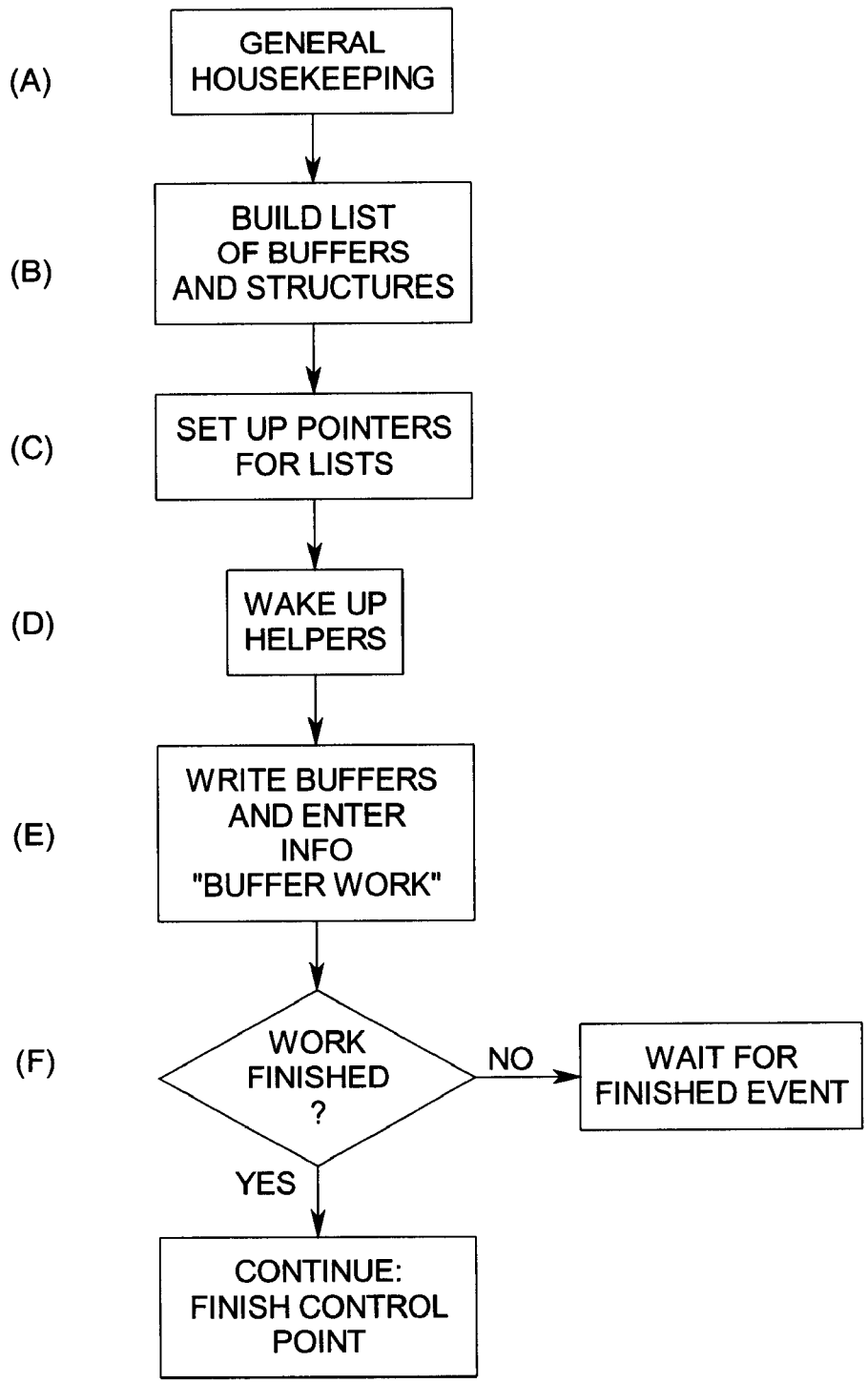
FIG. 4A is a flow chart indicating a generalized version of the steps required to allow for the concurrent set of operations of writing buffers and entering them into the structured data files.

Referring to FIG. 4A, there is seen a set of steps which are called from the "from local procedures" which refers to the user application program steps just prior to entering into the database engine steps that are used in order to flush the buffers; which means that the data of the buffer has now been written to a disk file. This may only involve copying the data from the buffer into the disk file and leaving the data still residing and accessible in the buffer. Thus, the space occupied in the buffer by whatever has been flushed, may or may not become available for other uses. Thus, in step A, the first operation involves the general housekeeping duties and tasks such as setting the process control variables to their initial states in preparation for writing the buffers.

Then at step B, the system will build a list of buffers and structures involved. The various internal substeps of this operation are later shown in FIG. 4B. At step C, the system will set-up pointers for the list.

At step D, the system will wake-up the "helpers", which are the other user application programs that are waiting in database code for the control point to complete in order that they may resume their own work.

At step E, the system will enter into procedures that write the buffers and update specialized information that is used to maintain the physical integrity of the data (this is known as storage control information).

At step F, a decision block is operated to check whether the work has been finished. If the answer is "NO", then the system must wait for the finished event. If the answer is "YES", then the system will continue to finish the CONTROLPOINT which is performed when the last process leaves the transaction state.

Figure 4B:
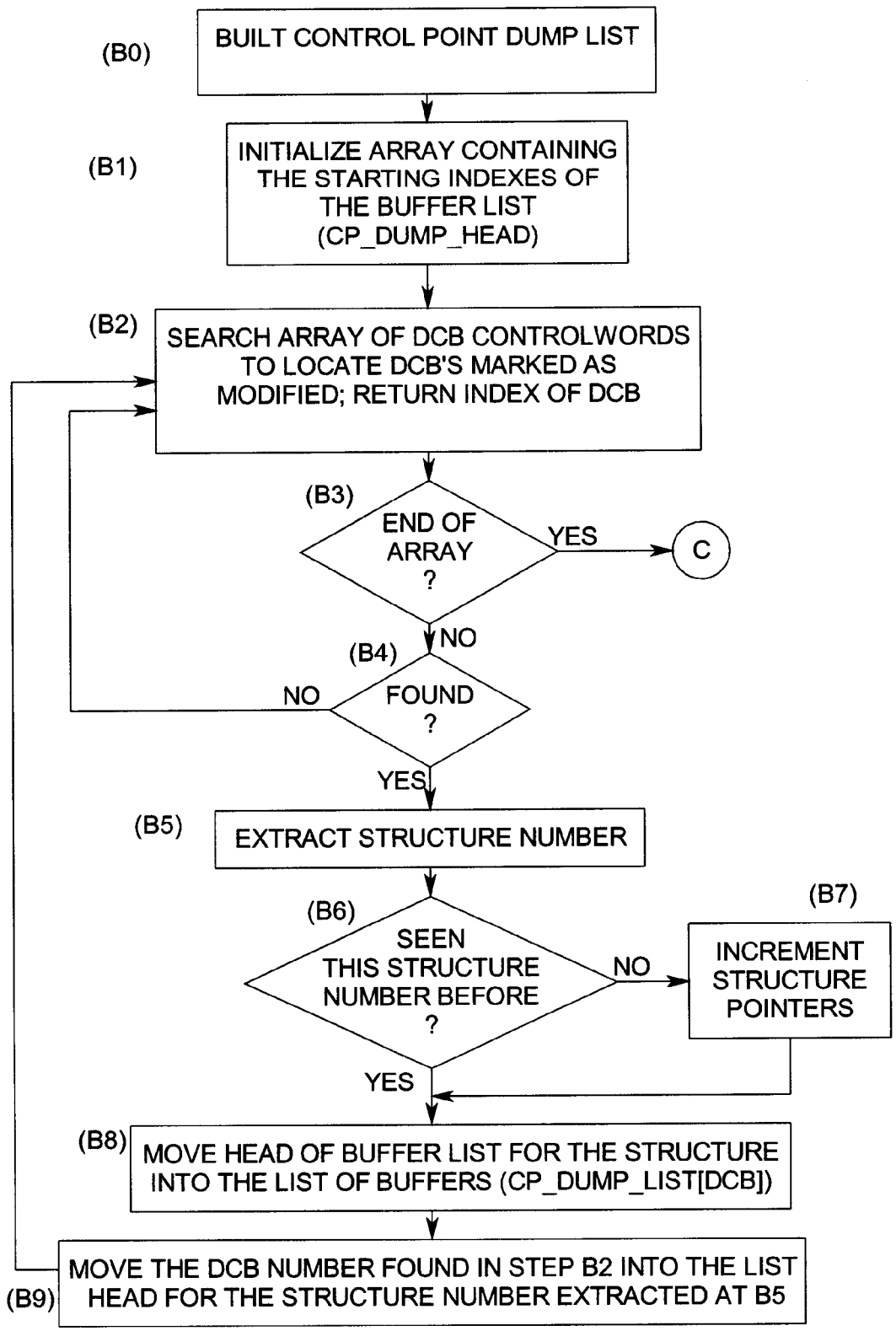
FIG. 4B is a flow chart illustrating the subset of step operations which constitute step B of FIG. 4A.
Figure 4C:
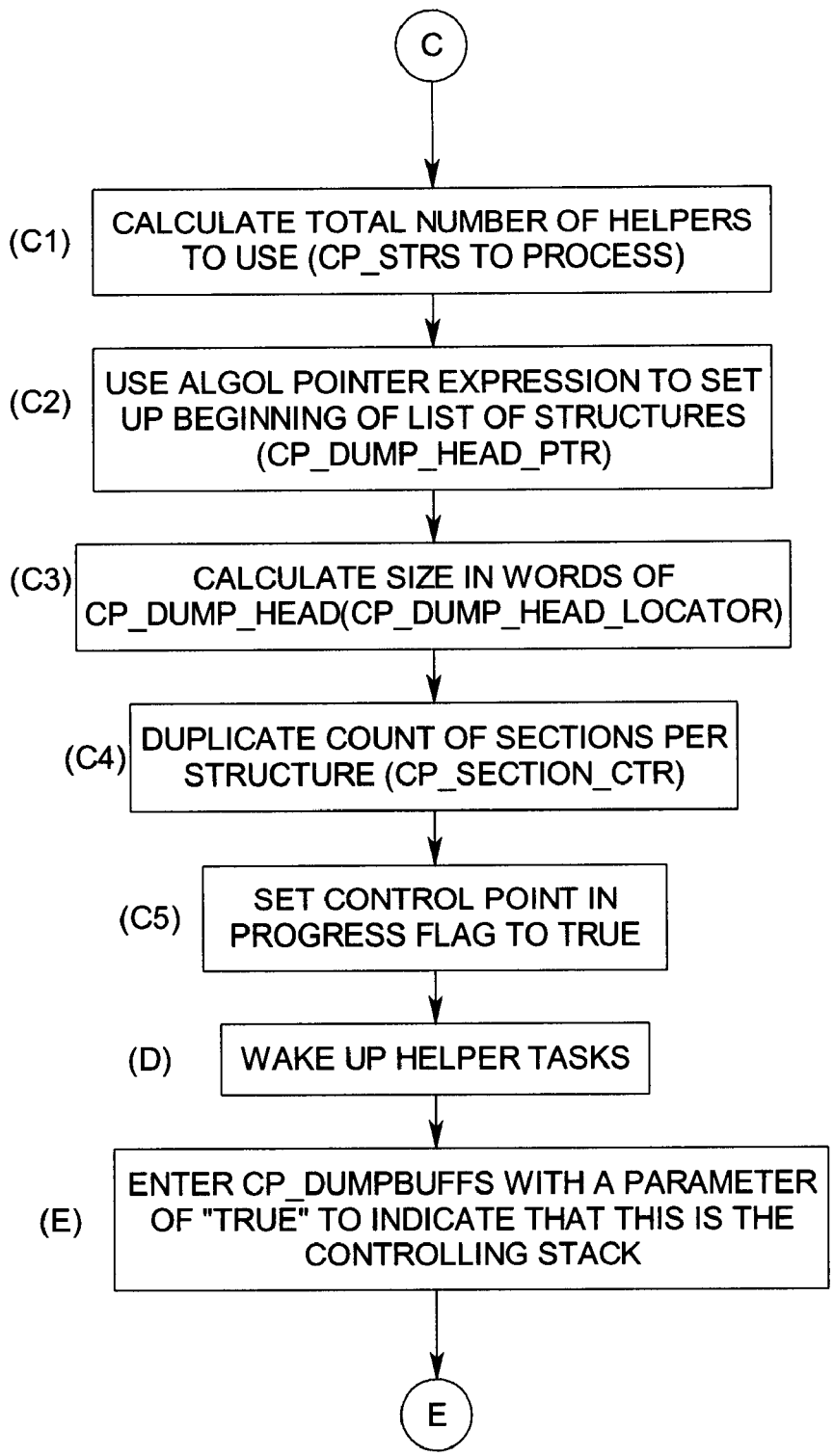
FIG. 4C is a flow chart showing detailed steps of step C of FIG. 4A.

Referring to FIG. 4B1, which is a more detailed set of steps of section B, which involves building a list of buffers and structures. Thus, in FIG. 4B1, the first step involves step Bo, which involves building a CONTROLPOINTDUMP list.

Then at step B1, the system will initialize an array containing the starting indexes of the buffer list (CP_DUMP_HEAD).

At step B2, the system will search the array of DCB control words (FIG. 3) to locate the DCB's marked as having been modified; then return the indexes of the DCBs.

At step B3, a decision point is reached to ask whether this is the end of the array. If the answer is "YES", the system will exit. If the answer is "NO", then the system goes to step B4 to see if any other DCB's have been found, after which the system returns back to step B2.

At step B4, if another modified DCB has been found, then at step B5, the system will extract the structure number. Then at step B6, the system will query whether this structure has been seen before. If the answer is "NO", then the system will increment the structure pointers. However, if the structure number has been seen before "YES", then the procedure will go onto step B8 of FIG. 4B2.

It should be noted that the storage disks or database files of FIG. 1 (31, 32, 33) constitute a set of data structures which may be a series of files which follow a sequence of 1, 2, 3, . . . , N. Each of the structures shown in FIG. 1, such as 31a, b, and 32a, b, etc., can be considered as a "logical file." However, each of these logical files will consist of physical files which may be considered as files 1, 2, 3, . . . , N physical files.

As will be described later in FIGS. 4D, 4G, "step zero" is designated as a sequence of operations where there is a writing to the buffers for all the structures or sections involved. Then step 1, FIG. 4F, is a set of operations where there is a checkout for successful I/O completion for all the structures and sections, that is to say, to see that the buffers were copied into the appropriate file structures.

Figure 4D:
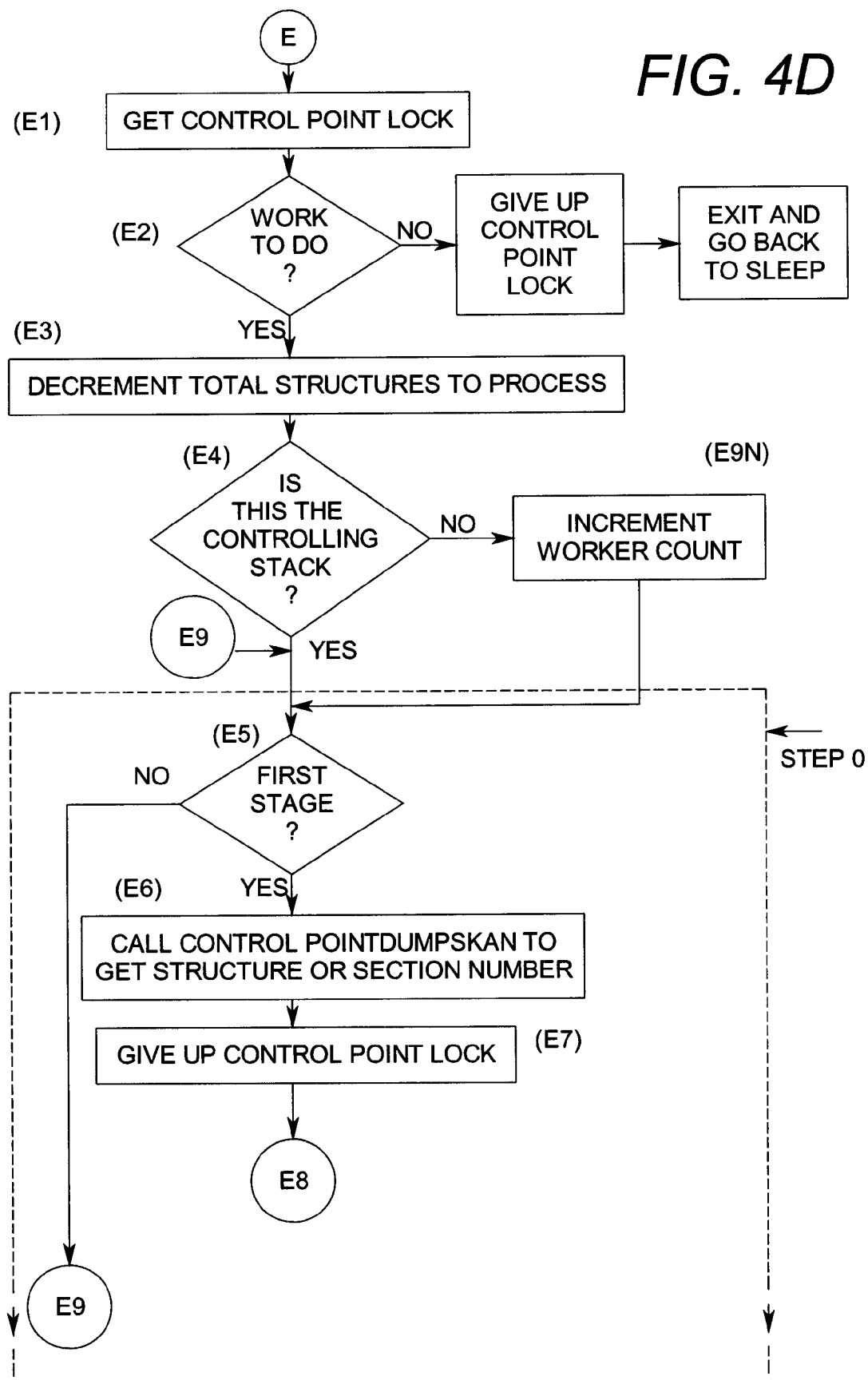
FIG. 4D is a flow chart which continues step E of FIG. 4C; 4C.
Figure 4E:
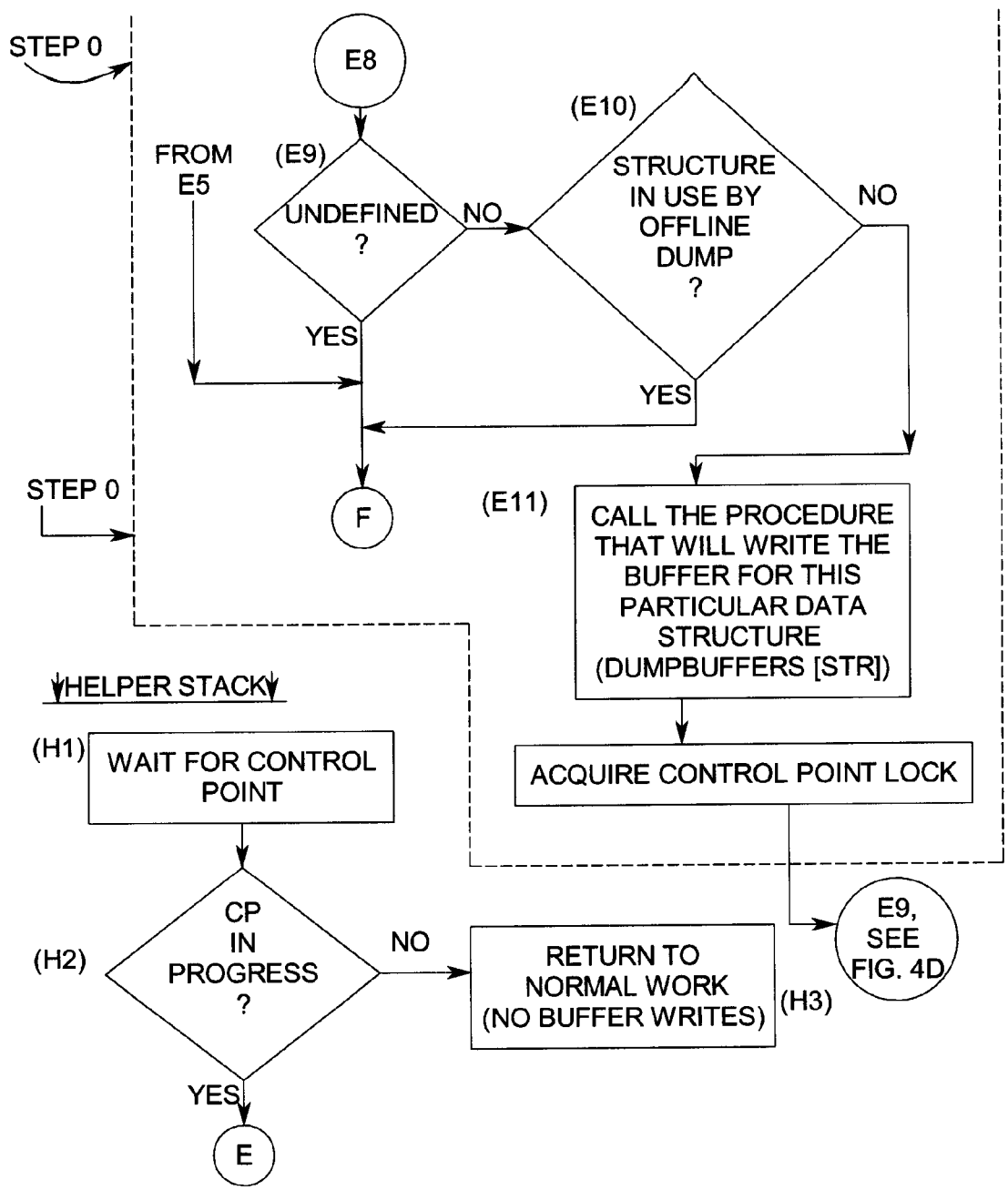
FIG. 4E is a flow chart which continues step E of FIG. 4D and also shows the Helper Stack.
Figure 4F:
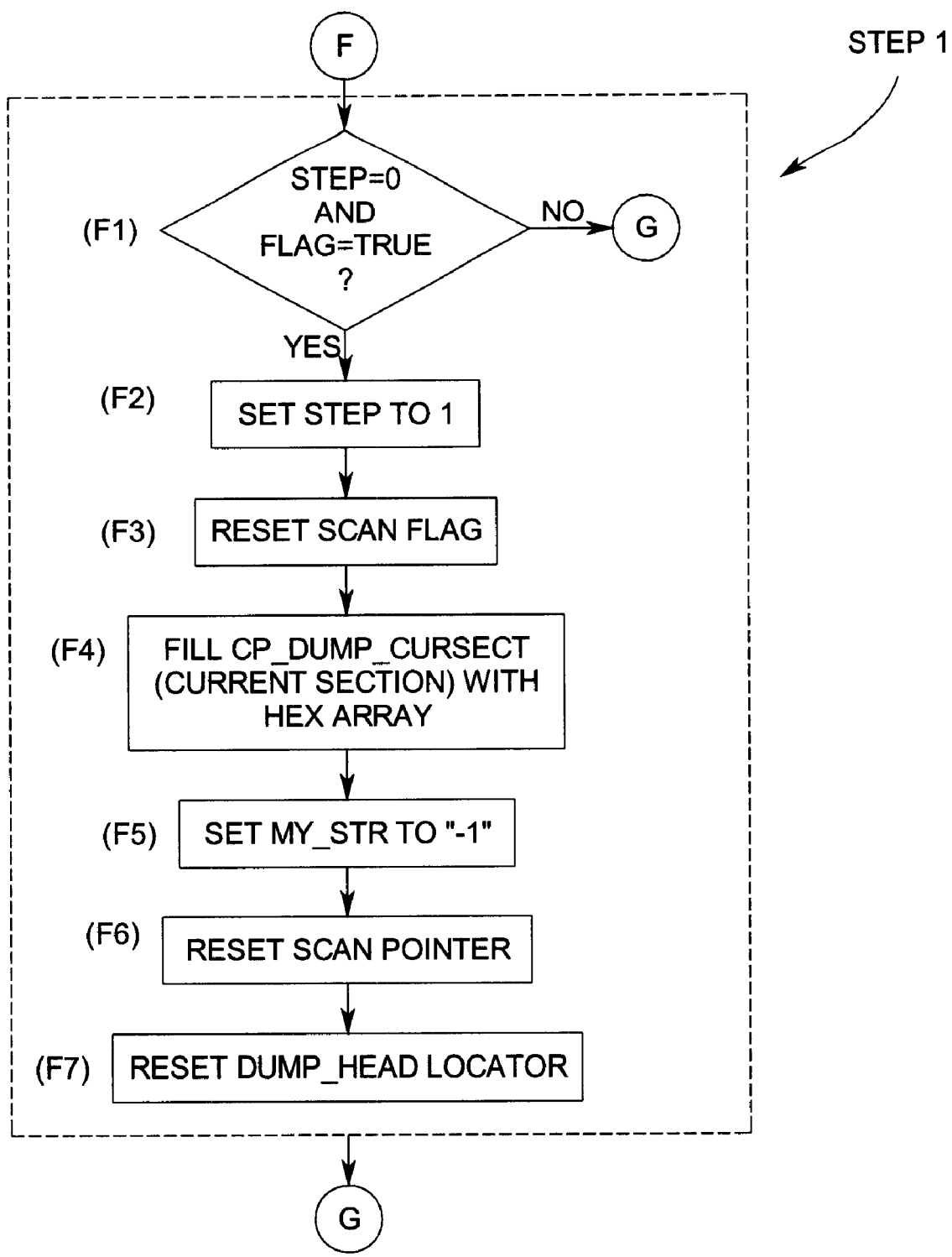
FIG. 4F is a flow chart showing step F of FIG. 4E.
Figure 4G:
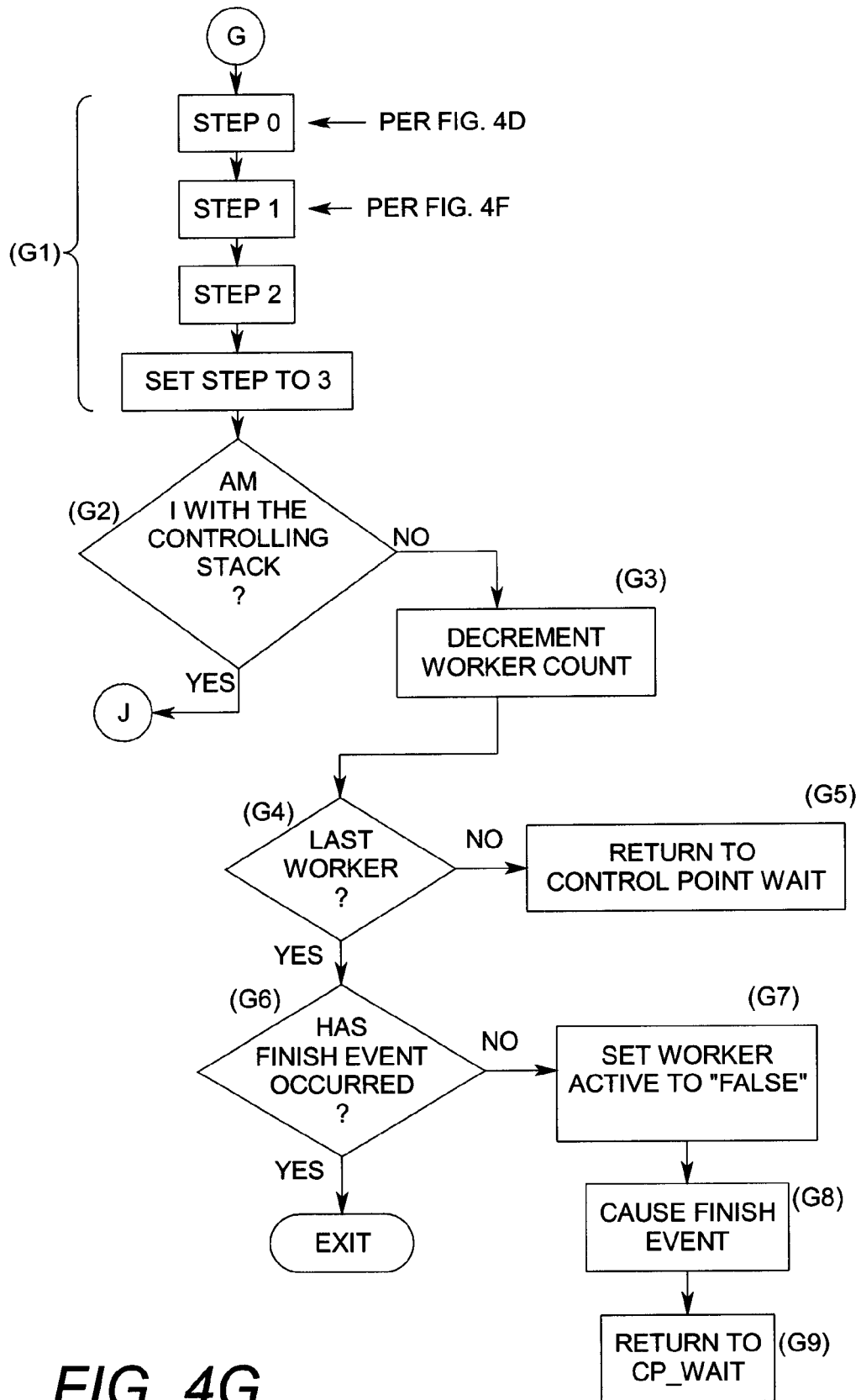
FIG. 4G is a sketch showing the four step sequences of FIG. 4D, 4E, 4F which then operates to finish the Stack Control.

It should be noted that there is a parallel operation here in that step zero, (0) FIGS. 4D, 4G, there are many write operations going to different buffers and operating in parallel. Likewise, in step 1 FIGS. 4F, 4G, there is a multiple set of operations to check for successful I/O completion all operating in parallel.

Then step 2, FIG. 4G, is the performance of the storage control Writes for all of the structures. These also occur as a multiple set of asynchronous operations.

Thus, step "zero" (0) FIGS. 4D, 4E, and "one" (1) FIG. 4F involves user data while step 2 FIG. 4G, involves the storage control information used to manage the user data.

Now referring to FIG. 4I there is seen a flow chart of the step 1 operation where at step F1 there is a decision block to query whether or not this is still step zero (this limits the execution of steps F1 thru F7 to being performed once by a single task) and whether the flag is "true." If the answer here is "yes" then at step F2 the next procedure step number is set to step number 1. After this at step F3, there is a resetting of the scan flag. And subsequently at step F4 the procedure fills the array CP_DUMP_CURSECT (Current Section) with the value of hexadecimal F (all bits on) to indicate that the array cells are in their initialized state. At step F5 the procedure is to set to minus one (−1) for the value of MY_STR.

After this then step C2 will use the ALGOL pointer expression to set up the beginning of the list of structures. This Pointer is designated CP_DUMP_HEAD_PTR.

Then at step C3 the program will calculate the size and words of the CP_DUMP_HEAD (designated as CP_DUMP_HEAD_LOCATOR).

In step C4 there will be provided a duplicate count of the sections per each structure; this sequence is designated CP_SECTION_CTR. By using a duplicate the original values can be preserved while the duplicate is consumed by this process.

At step C5 the program will set the control point in progress flag to "true."

Then upon completion of step C5 the program will progress to step D, which involves the waking up of the helper tasks.

This progresses to step E where there is an entering of the procedure CP_DUMP_BUFFS with a parameter of "true" to indicate that this system is in the controller stack. The helper tasks enter with a value of "false".

Then the sequence of E continues by reference to FIG. 4D. Now referring to FIG. 4D, which shows the steps of the E sequence. Here at step E1 the program will get the control point lock (CPT_LOCK), after which at step E2 there is a decision block inquiring if there is work to be done by testing whether CP_STRSTO_PROCESS is greater than zero. If the answer is "no" then the procedure relinquishes the control point lock, exits, and resumes its previous state of waiting for the control point activities to complete.

At step E2 if the work to be done decision signifies "yes" then step E3 will occur where there is a decrementation of the total structures to be processed. The combination of steps E2 and E3 limits the number of workers to the number of files that must be written to: this reduces contention for the software lock CPT_LOCK. At step E4 another decision block inquires as to whether the stack is the controlling stack. If the answer is Know then there is an incrementation of the worker count (step E9). The logic sequence then proceeds to step E5, which is designated as "step zero".

At step E4, if the answer is "yes", then this is the controlling stack and the worker count (step E9) is not incremented. Next, a sequence of operations will occur which is designated as "step zero."

This step zero will be seen to encompass steps E5, E6, E7, and E8 thru E11.

Thus at step E5, a query is done to see whether this is step zero, and if the answer is "yes" then at step E6 there is executed a procedure called CONTROLPOINTDUMPSKAN resulting in the acquisition of either the structure number or the combination of the structure and section numbers. After this at step E7 there is the giving up of the control point lock which leads to step E8 which continues on FIG. 4E. Giving up the lock allows other stacks traversing this area of code to obtain their own unique value of structure or structure and section numbers by calling CONTROLPOINTDUMPSKAN.

In FIG. 4E there is shown a continuation of step zero where step E8 leads to the decision block E9 designated "undefined." This is where the information returned from CONTROLPOINTDUMPSKAN is examined and determined to be either valid structure information or a value ("UNDEFINED") that signifies that the list of structures has been exhausted.

If the answer is "no" then the procedure goes to step E10 which is another decision block inquiring whether the structure is in use by the offline dump (software for backing up database structures). If the answer here is "no" then at step E11, there will be a calling of the procedure that will write the buffer for this particular data structure. The procedure is designated DUMPBUFFERS [STR]. Upon completion of DUMPBUFFERS, the CPT_LOCK is reacquired and the task returns to step E5 (FIG. 4D). Returning to step E9 on the "yes" leg, it is seen that the next sequence of steps is defined by the step F which is shown subsequently in FIG. 4F.

Returning to FIG. 4E, there is seen an indication of the helper stack. The helper stack relates to participation in step E but first starting at step H1 there is a waiting for the control point to occur during and after which at step H2 a decision block occurs as to whether the control point is still in progress. If the answer is "no" then step H3 will return the system back to its normal work routines either without any need for buffer writes or after they have been completed.

If step H2 is answered in the affirmative "yes", then the sequence continues on to step E which was shown in FIG. 4D.

Now referring to FIG. 4F there is seen a flow chart of the step 1 operation where at step F1 there is a decision block to query whether or not this is still step zero (this limits the execution of steps F1 thru F7 to being performed once by a single task) and whether the flag is "true." If the answer here is "yes" then at step F2 the next procedure step number is set to number 1. After this at step F3, there is a resetting of the scan flag. And subsequently at step F4 the procedure fills the array CP_DUMP_CURSECT (Current Section) with the value of hexadecimal F (all bits on) to indicate that the array cells are in their initialized state. At step F5 the procedure is to set to minus one (–1) the value of MY_STR.

At step F6 there is a resetting of the scan pointer and at step F7 there is a resetting DUMP_HEADLOCATOR. The above operations are performed in preparation to entering into the next phase. From this the procedure goes to step G which is seen in FIG. 4G.

Referring back to step F1, if the answer is "no" then steps just described for the "yes" branch have been completed (they must execute once and only once for any given control point) and the procedure goes to step G which is seen in FIG. 4G.

Referring to FIG. 4G the bracket G1 is placed to indicate how a series of steps are done in sequence such as step zero, step 1, step 2, and then the setting made to step 3. The logic is essentially the same as already described for FIGS. 4D, 42, and 4F. The difference lies in the parameters passed to DUMPBUFFERS at E11. There are three types of calls into DUMPBUFFERS: the first will cause the data buffers to be written, the second will cause the I/O completion activities to occur, and the third causes the Storage Control information to be written. From the setting of CP_STEP to 3 the next sequence item is designated as G2 which is a decision block to query "am I with the controlling stack?" If the answer is "yes" then the program proceeds to step J which is seen in FIG. H.

At step G2 if the answer is "non then the sequence proceeds to step G3 which involves decrementing the worker count after which there is decision block G4 to question whether this is the last worker. If the answer is "yes" then at step G6 another decision block inquires - - - has a finish event occurred? - - - and if this is the case "yes", the program will exit and return to waiting (the same as for G5 described below) for the controlling stack to finish the remainder of the Control Point activities. Now returning back to step G4 querying whether this is the last worker, if the answer is "no" then the sequence proceeds to step G5 which is a return to its state of waiting for all of the control point activities to finish.

Then returning to step G6 on the decision as to whether the finish event has occurred, if the answer is "no" then at step G7 the program will set the worker active flag to "false." After this at step G8, there will be caused the finish event and at step G9 there is a return to Control Point waiting as just described. For all intents and purposes these are returns to H1 on FIG. 4E.

Figure 4H:
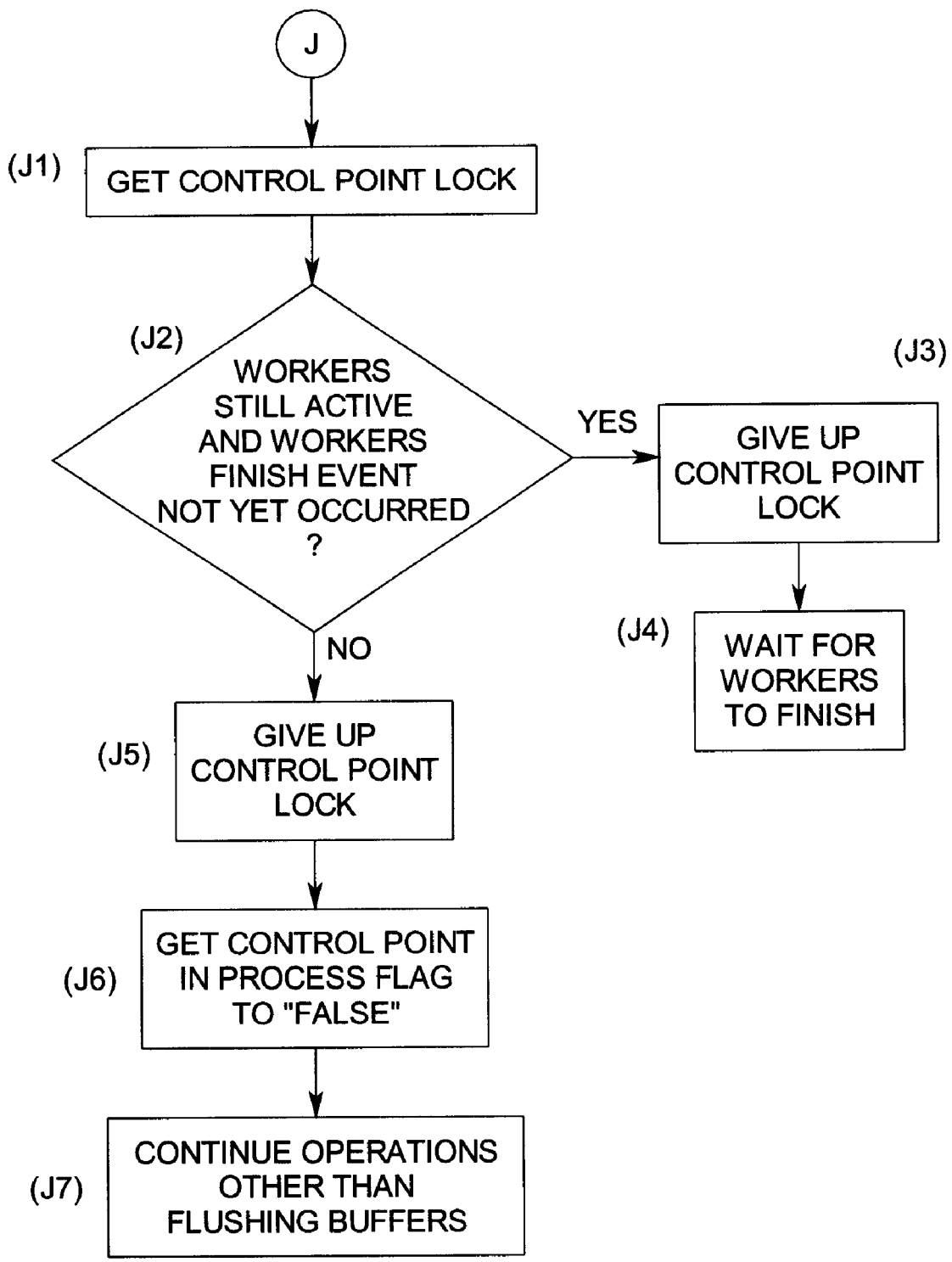
FIG. 4H is a flow chart showing step J from FIG. 4G.

Referring to FIG. 4H there is seen the J sequence which derives from step G2 in FIG. 4G.

Now that J sequence in FIG. 43 starts at step J1 where the system will get a control point lock (CP_LOCK). After this at step J2 there in a decision block with the inquiry if the workers are still active and whether or not the workers finished event has not yet occurred.

If the answer to step J2 is "yes" then at step J3 the system will give up the control point lock and at step J4 it will wait for the workers to finish.

Returning to step J2 if the answer is "no" then at step J5 the system will give up the control point lock and at step J6 it will set the control point in progress flag to "false."

Then at step J7 the controlling stack will continue on to finish the remainder of the Control Point work and, just prior to finishing will awaken the tasks that had gone back to waiting after helping with the buffer flushing. At this point, all tasks are able to proceed with normal ordinary processing operations other than that of flushing the buffers and writing structure control information associated with Control Points.

Now referring to FIG. 4I1, there is seen the procedure called "CONTROLPOINTDUMPSCAN". This procedure comes from and is referenced to the step E6 of FIG. 4D and illustrates the step procedures involved obtaining structure and section numbers from the previously built lists.

In FIG. 4I1, starting at step K1, there is seen a decision block which has the query of CP_DUMP_HEAD_LOCATOR as to whether this is greater than zero. This tests whether there are entries remaining in the list. If the answer is "YES", then the sequence proceeds to step K–2 which is another decision block which inquires whether the structure number is greater than zero. If the answer is "YES", then this is not the very first scan and the procedure goes to step K–3 to another decision block which has the query of CP_DUMP_CURSECT, which involves seeking to know whether this structure is one that is sectioned (made up of multiple physical files).

If the answer at K3 is yes, then the sequence proceeds to K4 in order to increment the local value of the section number for this structure, this variable being designated CP_MYSECT.

The next step is step K6 which involves a decision block to inquire whether CP_SECT is less than the maximum for this structure. If the answer here is "YES", then the sequence proceeds to step K7 where it will save the section number for use by the next worker when it reaches step K3. This involves the array designated CP_DUMP_CURSECT which is indexed by the structure number.

After this at step K8, the program will exit and return the value of the structure number and the section number, and then return to step E6 of FIG. 4D.

The present sequence of events involved a series of "YES", starting from step E6 in order to arrive back to the finality of E6. However, it is necessary to look at the other choice involving "NO".

At step K1, if the answer is "NO", then the sequence proceeds to exit and return the value of "undefined" at step K12, which then returns to step E6 at FIG. 4D.

At step K1, if the answer is "NO", then the sequence proceeds to step K9 where there is a scan for structures with buffers to write. This then proceeds to step K10 which is a decision block to question whether the list of structures have been exhausted or not. If the answer is "NO", then the sequence proceeds to step $K_c$ on FIG. 4I2.

At step K10, if the answer is "YES", that is to say the list of structures are exhausted, then at step K11 there is a setting of the scan flag to "TRUE", after which there is an exit and return value of "undefined" at step K12, which then returns to step E6 at FIG. 4D.

Now returning to step K6 of FIG. 4I1, where the decision block has a "NO" response, then the sequence proceeds to step K13 in order to advance to the next cell of the pointer associated with CP_DUMP_HEAD so that the next scan operation will proceed to the next structure. After this at step K14, the sequence will convert the scanner index to the structure number and get the value of the index into the array designated CP_DUMP_HEAD.

From step K14 to step K15 there appears a decision block to query said index at to whether the list is exhausted. If the answer is "NO", then the sequence returns back to step K9. If the answer at step K15 is "YES" (list exhausted), then the procedure goes to step K16 to set the scan flag to "TRUE".

Now, referring to FIG. 4I2, which continues from the step $K_c$ from FIG. 4I1.

At FIG. 4I2, the first step is designated $K_{c1}$ which involves converting the scanner index to the structure number. This then proceeds to step $K_{c2}$ which involves a decision block as to whether the structure is sectioned or not. If this is a "YES", then at step $K_{c3}$ the procedure will take the initialized section number and set it to zero, after which at step $K_{c4}$ there will be a return of the structure number and the section number during which the sequence proceeds to step E6 of FIG. 4D.

Returning to step $K_{c2}$ of FIG. 4I2, there is the query of whether this structure is sectioned or not? Here, if the answer is "NO", the sequence proceeds to step $K_{c5}$ to advance the CP_DUMP_HEAD pointer. After step $K_{c5}$, the next step $K_{c6}$ is a decision block to query whether the structure list is exhausted or not. If the answer is "NO", then at step $K_{c8}$ there will be a return of the structure number to step E6. However, if the answer is "YES", then the procedure goes to step $K_{c7}$ and will set the scan flag to "TRUE".

In the earlier version of the Unisys DMS II system, the CP_SOC_BUFF array was a shared buffer used to handle storage control rights by a procedure designated STORAGEOPENCLOSE during the CONTROLPOINTS. In the earlier implementation, this was declared at the D2 level. The designation D2, D3 . . . D8 level involves a lexical level, or lax level, which involves a number that indicates the relative level of an addressing space within the stack of an executing program. Here, (i) The lexical levels range from "0" through either 15 or up to 31 depending on the type of computer family. A "lower" lexical level indicates a more global addressing space. (ii) It is also a measure of the number of other blocks that a given block is nested within. The outer block of a program has a lex level of 2 or 3, depending on whether the program has a procedure heading. Each block has a lex level which is one higher than the block it is nested within.

The present system rather now declares an array in what is called the COMMONDBS in order that a private CP_SOC_BUFF exists for each individual structure or section (no need for buffer sharing). This allows concurrent Input/Output (I/O) activity for multiple structures and sections, during the time of performing storage control updates during a CONTROLPOINT. In the earlier operational system of the Unisys DMSII, the CONTROLPOINT-DUMP procedure consisted of three modules, each of which was controlled by bits located in the parameter passed in when it was called (the OP word). This procedure was called twice when executing a "CONTROLPOINT". The first call here resulted in executing modules one and two, while the second call executed modules two and three. Modules two and three then call ALL_DUMPBUFFERS, a total of three times: once to initiate the I/O's, once to wait for the I/O completions, and once to clean-up any remaining storage control information.

Now, quite contrarily, the new system and method divides this into three separate procedures, the first one, BUILDCOTROLDUMPLIST, and this is only executed by the controlling stack, that is to say, the last one out of the transaction state. This builds the list of structures having buffers that must be flushed during this particular control point. In addition, the first procedure counts the number of structures and the sections that will be involved in this particular CONTROLPOINT.

A "section count" is obtained from the array designated CP_DUMP_SECTINFO, which is indexed by structure number, and filled-in for sectioned structures by STROPEN-STRUCTURE of SECTION_SB when the structure is first opened for use. This only applies to data sets since index sequential is the only set type currently allowed to be defined as "XE", and they are actually a single physical file.

The second procedure, designated CONTROLPTDUMPSCAN, is called by all CONTROLPOINT participants in order to obtain the next available structure, and where appropriate, section numbers from the list that was built in the previous step. Logically, this occurs twice, once to write the buffers, and once to wait for the I/O completions. In actual practice, each of these activities occurs as many times as there are structures and sections to process.

Once the structure number (and the section number) is obtained, then the procedure ALL_DUMPBUFFERS can be called. The outer block DUMPBUFFERS for sectioned structures (data sets) will call specific sections when a CONTROLPOINT is in progress.

Actual test results have indicated that this configuration of the new method resulted in considerably better performance than having each caller issue a task and then have to wait for its own I/O completions.

The final step involved is to perform the storage control I/O's on the remaining structures and sections. The requisite structure/section information is then obtained by calling the program CPGETALLSTRNUMS.

The initial housekeeping (step A of FIG. 4A) and control of the list building occurs in the procedure AUDITCONTROLPOINT. The actual CONTROLPOINT work as described above, is coordinated with a new procedure designated: CP_DUMPBUFFS. It's various stages are coordinated by CP_SETP; in turn, each stage signals its completion by returning the value UNDEFINED, rather than a structure-number/section-number pair.

The controlling stack enters CP_DUMPBUFFS with a parameter value of TRUE, and all helper stacks enter with FALSE. The parameter, called CTLSTACK, is used upon entry and exit to control information associated only with the helper stacks.

The procedure involves a new lock, CPT_LOCK, which coordinates access to the structure and section numbers. Further, in order to minimize contention, the number of stacks allowed to participate is limited to the number of structures and sections (CP_STRSTOPROCESS and CP_TOTAL_SECTS) which is obtained from the BUILD-CONTROLPOINTDUMPLIST.

The helper stacks" are awakened by executing a DMSCAUSE ("0"). Now, given that CPINPROGRESS in TRUE, then the helper stacks enter CP_DUMPBUFFS which then follows the steps described above. After the helper stacks exit, they go back to sleep and wait for the CONTROLPOINT to complete in the standard procedural fashion.

Described herein is an asynchronous mechanism which distributes the workload of flushing data buffers of the file structures by operating concurrently over a number of processes. A singular advantage is one of taking and using user tasks which are already running on a single or multiple processor computer system. Thus, the time required to accomplish the task of writing buffers and then flushing or copying them to structured data files is minimized in basically two ways.

Initially, all of the Write operations are initiated which means there is an exceedingly high probability that the first started Write operations will have finished even before the last set of Write operations have been initiated. Likewise, there is a series of tests in order to determine the correct completion of the operations as having been copied from buffers to the final repository locations in the structured files. Thus, likewise in a parallel sequential manner the I/O completions are handled similar to the sequence of initiations done by the Write operation. This reduces the probability of any necessity to wait for some operation to complete.

As a second advantage, the workload is spread across the active update users of the system, so this permits a multi-processor system to take advantage of the ability to perform multiple tasks simultaneously. Another advantage of the present system is that the use of existing application tasks does not burden the system with the overhead of initiation and management of specialized tasks. Thus, the present method enables full advantage of the parallelism of operations inherent in multi-processor computer systems.

While the preferred embodiment of the method has been described in specific detail, the invention may also be implemented in other similar ways and should be considered to be defined by the attached claims.

What is claimed is:

1. A method utilizing a stack architecture having user applications with ACCESSROUTINE algorithms running on top of said user applications for concurrently enabling multiple processors and multiple user applications to asynchronously access selected data in selected buffer units of a buffer pool, thus to permit concurrent flushing of multiple buffers to an interconnecting database disk structure, said method comprising the steps of:
   (a) building a list of modified buffer units and associated file structures;
   (b) setting a series of address pointers for said list of modified buffers and file structures;
   (c) writing the data from said modified buffers into the database disk structures utilizing concurrently operating ACCESSROUTINE algorithms within a given database engine and operating on top of each user application which service multiple user applications.

2. The method of claim 1 which includes the steps of:
   (d) scanning the I/O completion results for each modified buffer written to a database file disk;
   (e) updating the file storage control information for each of the file structures which have been updated.

3. A method for flushing an array of data buffer units and copying them into a database file structured database stack on an ongoing parallel concomitant basis by multiple processors and multiple user applications operating in parallel, said method comprising the steps of:
   (a) providing a series of data control blocks holding control information that pertains to each particular modified data buffer unit said control blocks being part of said database stack;
   (b) utilizing each of said data control blocks to select particular modified data buffer units to Write a copy of said particular data buffer unit to a selected disk file structure.

4. In a system for updating disk files wherein multiple processors utilize an accessroutines program on top of each user application a method for flushing selected data buffers in a pool of data buffer units for Write-out to data disk file, comprising the steps of:
   (a) searching each data control block within a set of arrays which comprise Data Control Blocks each of which holds control information pertaining to each modified buffer unit;
   (b) building a list of modified buffers via a set of parallel arrays;
   (c) initiating the scanning of said arrays containing linking information to said list of buffers;
   (d) searching said arrays of Data Control Blocks in order to locate those data control blocks which have been modified;
   (e) returning said linking information of selected Data Control Blocks to any one of said multiple processors;
   (f) executing by said processors in a concurrent fashion of the buffer writing and transferring of data from a selected buffer to a data disk file.

5. A method in a system of multiple processors with special accessroutines programs operating on top of each user application for writing selected buffer units, in a pool of buffer units, to selected stack oriented database disk files in a parallel concurrent set of write operations including the steps of:
   (a) setting up a plurality of parallel arrays which are organized as Data Control Blocks which indicate the modified condition of each buffer unit;
   (b) searching said parallel arrays to locate buffer units which have been modified;
   (c) organizing lists of said modified buffer units according to the particular database file structure they are associated with;
   (d) initiating multiple worker tasks in asynchronous parallel operations which write each selected modified buffer unit to its associated database disk structure.

6. The method of claim 5 which includes the step of:
   (e) reviewing the status of each said modified buffer unit to verify the completion of the Write operation for each modified buffer.

* * * * *